(12) United States Patent
Haupt et al.

(10) Patent No.: US 9,568,590 B1
(45) Date of Patent: Feb. 14, 2017

(54) DYNAMIC THINNING OF A PHASED ARRAY APERTURE

(71) Applicant: Ball Aerospace & Technologies Corp., Boulder, CO (US)

(72) Inventors: Randy L. Haupt, Boulder, CO (US); Luke J. Albers, Westminster, CO (US); Manoja D. Weiss, Arvada, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 402 days.

(21) Appl. No.: 14/161,481

(22) Filed: Jan. 22, 2014

Related U.S. Application Data (60) Provisional application No. 61/755,285, filed on Jan. 22, 2013.

(51) Int. Cl.
| | | |
|---|---|---|
| *G01S 3/16* | (2006.01) | |
| *G01S 7/28* | (2006.01) | |
| *H01Q 21/22* | (2006.01) | |
| *H01Q 3/26* | (2006.01) | |

(52) U.S. Cl.
CPC ............. *G01S 7/2813* (2013.01); *H01Q 21/22* (2013.01); *H01Q 3/26* (2013.01)

(58) Field of Classification Search
CPC .......... G01S 7/2813; H01Q 21/22; H01Q 3/26
USPC .................................. 342/368, 379–382, 372
See application file for complete search history.

(56) References Cited

U.S. PATENT DOCUMENTS

| | | | | | |
|---|---|---|---|---|---|
| 4,870,421 | A | * | 9/1989 | Peil ......................... | G01S 7/032 333/136 |
| 4,937,584 | A | * | 6/1990 | Gabriel ................. | G01S 7/2813 342/154 |
| 5,434,576 | A | * | 7/1995 | Haupt ....................... | G01S 3/06 342/378 |
| 6,317,467 | B1 | * | 11/2001 | Cox ...................... | H04B 7/0617 342/379 |
| 7,671,798 | B2 | * | 3/2010 | Leonard ................. | H04B 17/21 342/174 |
| 9,075,128 | B2 | * | 7/2015 | Chew ..................... | G01S 7/2813 |
| 2006/0202891 | A1 | * | 9/2006 | Izumi ..................... | H01Q 3/267 342/368 |
| 2006/0227049 | A1 | * | 10/2006 | Lewis .................... | H01Q 21/06 342/372 |
| 2008/0291087 | A1 | * | 11/2008 | Tietjen ...................... | G01S 7/03 342/372 |
| 2012/0119952 | A1 | * | 5/2012 | Pozgay ................ | H01Q 21/061 342/372 |
| 2014/0104107 | A1 | * | 4/2014 | Mangenot ................ | H01Q 3/26 342/371 |

\* cited by examiner

*Primary Examiner* — Marcus Windrich
(74) *Attorney, Agent, or Firm* — Sheridan Ross P.C.

(57) ABSTRACT

Methods and systems for thinning the output of an array antenna are disclosed. The thinning can be applied in response to determining that the performance of a multiple element antenna array with respect to a desired signal has been compromised by the presence of one or more interfering signals. The application of a thinning pattern has the effect of turning off selected antenna elements within the array. The effect of applying a particular thinning pattern on the realized performance of the antenna system can be determined. An alternate thinning pattern can be applied if the previous thinning pattern did not result in an improvement, or a sufficient improvement, in the performance of the antenna system.

20 Claims, 7 Drawing Sheets

DYNAMIC THINNING OF A PHASED ARRAY APERTURE

CROSS REFERENCE TO RELATED APPLICATIONS

The present application claims the benefit of U.S. Provisional Patent Application Ser. No. 61/755,285, filed Jan. 22, 2013, the entire content of which is hereby incorporated herein by reference.

FIELD

Systems and methods to adaptively place nulls in the antenna pattern of array antennas in order to reject interfering signals in real-time are provided.

BACKGROUND

Array antennas, including but not limited to phased array antennas, are used in a wide variety of applications. In operation, the individual elements of the antenna are controlled to produce a desired beam pattern. For example, it is often desirable to produce a beam pattern having a main beam aligned in a direction of interest, while at the same time attenuating the sidelobes or beams in directions that are not of interest. This general configuration can increase the signal to noise ratio of the overall signal received by the antenna for a signal source aligned with the main beam.

Phased array antennas can be controlled to lower sidelobe levels or to place a null in the direction of jammers or other interfering signals. Almost all antenna array adaptive nulling algorithms require digital beamforming or a receiver at every element of the array in order to form a covariance matrix for calculating the adaptive weights. Digital beamforming is impractical for large arrays due to the cost of the required hardware and software systems. In addition, while there is some ability to attenuate the gain of an array antenna in areas outside of the main beam, sidelobes of various amplitudes will generally be present at various angles relative to the main beam. Therefore, selecting a beam pattern that produces nulls in areas of the beam pattern corresponding to interfering signal sources can be difficult.

SUMMARY

Embodiments of the present disclosure are directed to solving these and other problems and disadvantages of the prior art. In particular, an array antenna that is capable of dynamically reconfiguring a beam pattern in response to detecting the presence of an interfering signal is provided. More particularly, different thinning patterns can be applied until a thinning pattern that provides an improved signal to noise ratio is identified. Operation of the antenna can then continue, using the thinning pattern providing the improved signal to noise ratio.

An antenna system in accordance with embodiments of the present disclosure generally includes an array of antenna elements that are operated to produce a beam pattern having a main beam directed in a desired direction by operating the plurality of antenna elements according to a taper pattern. In response to determining that a signal to noise ratio of a signal received from a desired signal source is less than a predetermined amount, a thinning pattern is applied to change the location of sidelobes and nulls in the beam pattern. In particular, at least some of the antenna elements that are otherwise operational when the taper pattern is applied are turned off. If the application of the first thinning pattern is not effective at improving the signal to noise ratio by a sufficient amount, a second thinning pattern that turns off a different set of antenna elements that would otherwise be operational when the taper pattern is applied, to produce a different set of sidelobe and null locations.

In accordance with embodiments of the present invention, methods for providing an improved signal to noise ratio for a signal received by an array antenna include applying a selected signal taper across elements of an array antenna. The antenna is then operated, and a signal to noise ratio of a desired signal received at the antenna is determined. If the determined signal to noise ratio is, or later becomes, less than a desired threshold amount, a thinning pattern is applied. The thinning pattern modifies the taper pattern, to alter the location at which the sidelobes are present. Different thinning patterns can be applied until the signal to noise ratio improves. The different thinning patterns can be generated randomly or pseudo-randomly.

Additional features and advantages of embodiments of the present disclosure will become more readily apparent from the following description, particularly when taken together with the accompanying drawings.

DETAILED DESCRIPTION

Most phased arrays have transmit/receive (T/R) modules with switches to turn the modules on or off. A thinned array is a low sidelobe array that has active and inactive elements selected to create a spatial low sidelobe amplitude taper across the aperture. Since the thinning is statistical, many different combinations of elements turned on or off result in similarly low sidelobe levels but null and sidelobe locations that change. Embodiments of the present disclosure change the array thinning in order to change the location of the nulls. As discussed herein, a genetic algorithm can be used to dynamically change the thinning in order to reduce the interference. This approach has an inherent main beam constraint as well as low sidelobes. For instance, if a first thinning configuration is being jammed by interference, then a second thinning configuration may significantly reduce the jamming. Both configurations have the same or similar gain and sidelobe levels.

Figure 1:
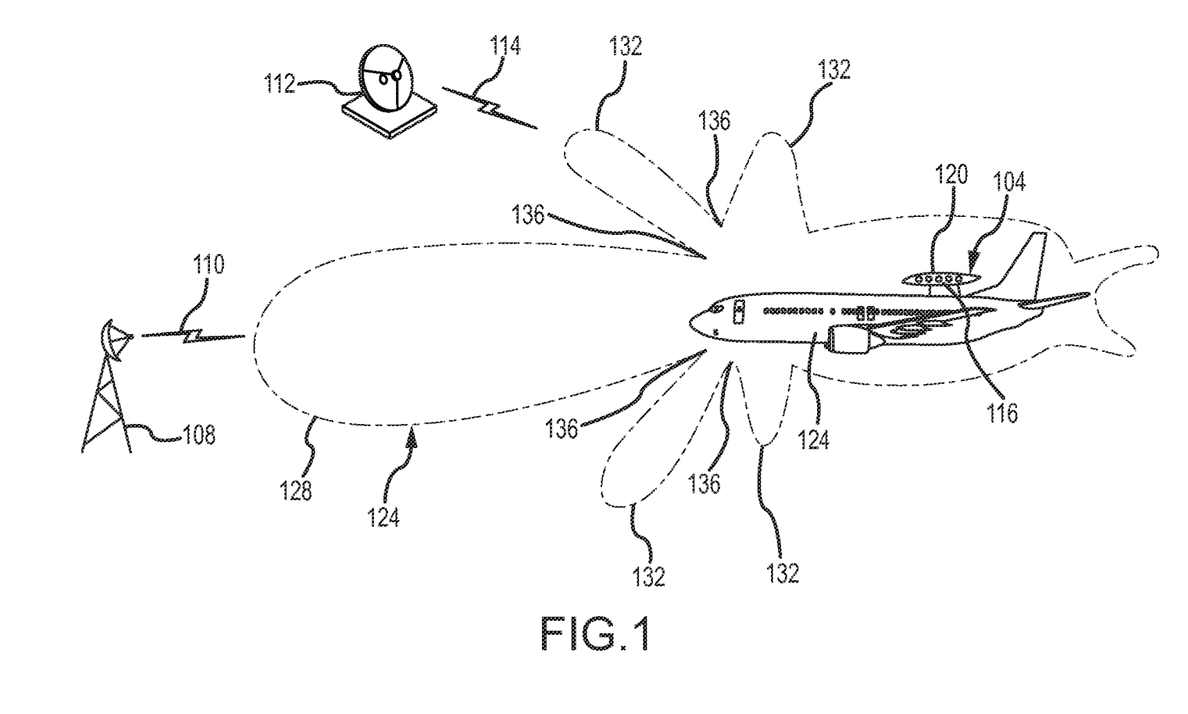
FIG. 1 depicts signal sources and an antenna system in accordance with embodiments of the present disclosure.
Figure 2:
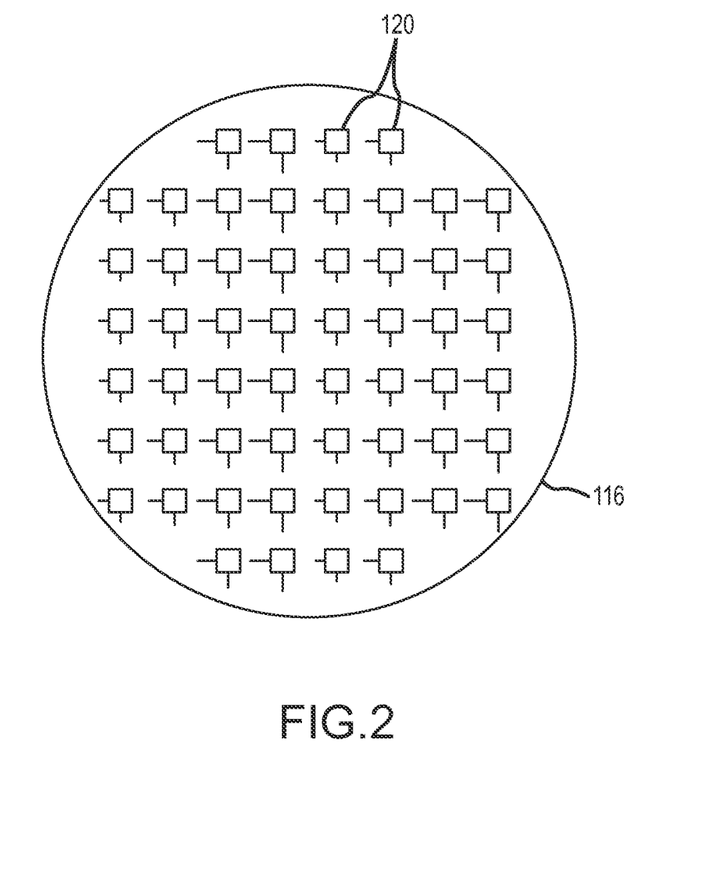
FIG. 2 depicts an antenna array in accordance with embodiments of the present disclosure.

FIG. 1 depicts an antenna system 104 in accordance with embodiments of the present invention, in relation to a desired signal source 108 associated with a desired signal 110, and an interfering or jamming signal source 112 associated with an interfering signal 114. The antenna system 104 includes an array 116 of antenna elements 120. For instance, the array 116 can comprise a two dimensional array of elements 120, as depicted in FIG. 2. As can be appreciated by one of skill in the art, and after consideration of the present disclosure, an array 116 can comprise an array with any number and shape of elements 120.

An example beam pattern 124, including a main beam 128 and a plurality of sidelobes 132, with nulls 136 therebetween, are illustrated. As can be appreciated by one of skill in the art, the beam pattern 124 represents the relative gain of the antenna array 116 with respect to signals at different angles relative to the antenna. In this example, the antenna system 104 is carried by an aircraft 124. However, it should be appreciated that the antenna system 104 can be associated with any vehicle or structure, or can be provided as a standalone system.

As shown, the desired signal source 108 and the interfering signal source 112 are at different azimuth and/or elevation angles relative to the antenna array 116. Therefore, by appropriately configuring the antenna beam 124 of the antenna system 104, a signal 110 from the desired signal source 108 can be placed in the main beam 128 of the beam pattern 124, while a signal 114 from the interfering signal source 112 can be placed in or towards a null 136. In accordance with embodiments of the present disclosure, a computationally efficient technique for altering the locations of the sidelobes 132 and nulls 136, while leaving the main beam 128 substantially unaltered, is provided. In particular, and as will be discussed in greater detail elsewhere herein, the selection of active elements 120 in the array 116 of antenna elements 120 can be reduced or thinned, as compared to a standard set of operating elements 120. Different thinning patterns can be applied in sequence, until a thinning pattern with a sidelobe 132 pattern that places an interfering signal or signals 114 in a null 136 is found. That thinning pattern can continue to be applied, at least until another interfering source 112 or a changed relative location of a previously encountered source 112 causes the perceived level of the desired signal 110 to fall below a threshold level. In accordance with embodiments of the present invention, the signal level can be evaluated as a signal to noise level or ratio.

Figure 3:
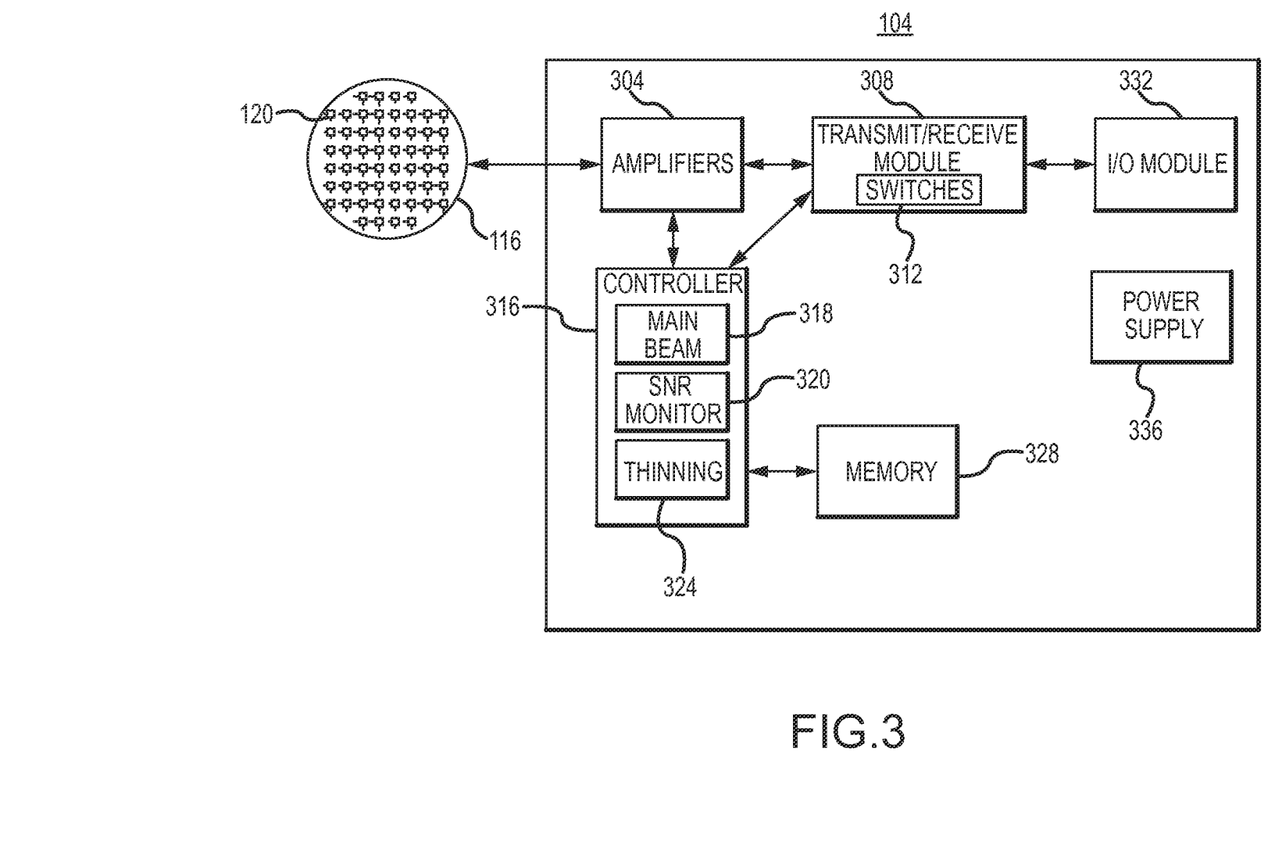
FIG. 3 depicts components of an antenna system in accordance with embodiments of the present disclosure.

FIG. 3 is a block diagram illustrating components that can be included in an antenna system 104 in accordance with embodiments of the present disclosure. In general, the antenna system 104 includes an antenna array 116, which in turn includes a plurality of elements 120. Each of the elements can be associated with an amplifier 304. The amplifier 304 can have a channel for each of the elements 120, or for subsets of elements 120. Alternatively or in addition, the amplifier 304 can include a plurality of switches. In addition, a transmit/receive module 308 can be provided. The transmit/receive module can include a channel for each of the elements. In addition, the transmit/receive module 308 can include a switch 312 for each channel, to enable or disable operation of an associated antenna element 120. The transmit/receive module 308 can also include other components, including but not limited to phase shifters, amplifiers, delay lines, local oscillators, pre-amplifiers, and the like.

The antenna system 104 can also incorporate a controller 316. The controller 316 can comprise a general purpose programmable processor, application specific integrated circuit, computer, or other device or element that is generally capable of executing instructions or code, for example stored as software or firmware, for controlling aspects of the operation of the antenna system 104. For example, the controller 316 can implement a main beam generation module 318, that determines or selects a taper to be applied to generate a desired beam pattern 124. The main beam generation module 318 can, for example, control the amplifier 304 and/or the transmit/receive module 308, to in turn control the elements 120 of the antenna array 116 that are operational at any one point in time. As can be appreciated by one of skill in the art, by controlling the identity of active antenna elements 120, and/or by controlling aspects of the signals provided to those antenna elements 120, including but not limited to the amplitude and phase of such signals, different beam 124 shapes and pointing directions can be generated. The main beam generation module 318 can, for example, operate in connection with programming code or instructions stored in memory 328. In addition, the main beam generation module 318 can select from predetermined beam pattern 124 generation instructions stored in the memory 328, and can implement a selected beam pattern 124 to provide an appropriate main beam 128 for a particular orientation of a desired signal source 108 relative to the antenna system 104. The controller 316 can also implement a signal to noise ratio monitoring module 320 that monitors the relative signal strength of a signal 110 from a desired signal source 108 as compared to a signal or signals 114 from one or more interfering signal sources 112. In addition, the controller 316 can implement a dynamic thinning pattern module 324 that is operable to modify the set of active antenna elements 120, to produce a thinning pattern in response to a signal to noise ratio that is determined by the signal to noise ratio module 320 to be below a predetermined threshold amount. For example, the dynamic thinning pattern module 324 can control the switches 312 in the transmit/receive module 308, switches included with the amplifiers 304, and/or the amplifier 304 themselves, to in turn control whether individual antenna elements 120 are operational or not. In accordance with still other embodiments, the dynamic thinning pattern module 324 can randomly or pseudo-randomly modify an amplitude taper determined by the main beam generation module 318. Moreover, as described in greater detail elsewhere herein, the dynamic thinning pattern module 324 can move through a series or sequence of alternate thinning patterns until an observed signal to noise ratio for a signal 110 from a desired signal source 108 is at or above some threshold value. In connection with embodiments in which alternate thinning patterns are determined pseudo-randomly, the dynamic thinning pattern module 324 can incorporate a pseudo-random number generator. In accordance with still other embodiments, alternate thinning patterns can be stored in the memory 328, and alternate thinning patterns can be selected in sequence, or pseudo-randomly, from the predetermined alternate thinning patterns.

Communications between the receive electronics and the antenna system 104 can pass through an input/output module 332. In addition, the antenna system 104 can include or be associated with a power supply 336. The antenna system 104 can also be associated with one or more input and/or output devices.

Figure 4A:
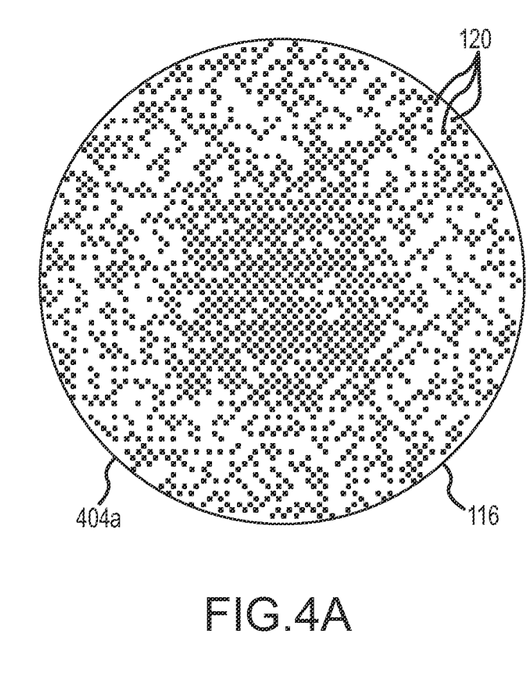
FIGS. 4A and 4B depict exemplary antenna array excitation patterns in accordance with embodiments of the present disclosure.
Figure 4B:
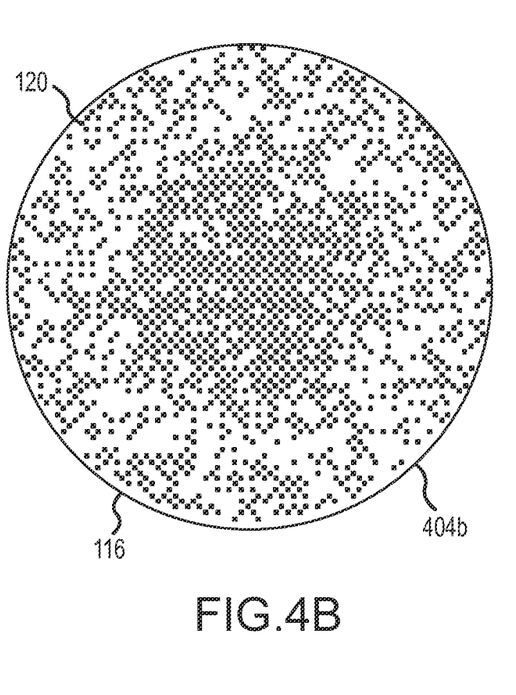

FIGS. 4A and 4B depict exemplary antenna array excitation patterns in accordance with embodiments of the present disclosure. More particularly, FIG. 4A depicts a first thinning configuration 404a, while FIG. 4B depicts a second thinning configuration 404b. In the different thinning configurations 404a and 404b, different antenna elements 120 within an array 116 are active. In this example, the number of individual antenna elements 120 included in the array 116 is large. For example, the array 116 can include more than 250 elements 122. Arrays 116 with fewer or greater numbers of elements 120 can also be used in connection with embodiments of the present disclosure. The antenna elements 120 that are active are depicted by solid dots. As can be appreciated by one of skill in the art after consideration of the present disclosure, the array 116 can be operated to implement a particular amplitude taper, and to produce a selected beam 124 configuration with a main beam 128 controlled so as to point at a desired signal source 108, at a particular direction and elevation relative to the antenna system 104. Moreover, as can be appreciated by one of skill in the art, an appropriate amplitude taper can be implemented by adjusting the phase and/or amplitude associated with individual antenna elements 120, according to known techniques and algorithms. Embodiments of the present invention provide different thinning patterns as overlays to a determined taper, to adjust the location of sidelobes 132 and nulls 136, while leaving the main beam 128, and the total sidelobe 132 energy substantially unaltered. As used herein, "substantially unaltered" means that the characteristics of the main beam 128 and the sidelobe 132 energy are changed by less than 5% in at least some embodiments, and less than 1% in at least some other embodiments. In accordance with still other embodiments, at least characteristics of the main beam 128 are substantially unaltered.

Figures 5A, 5B, 5C:
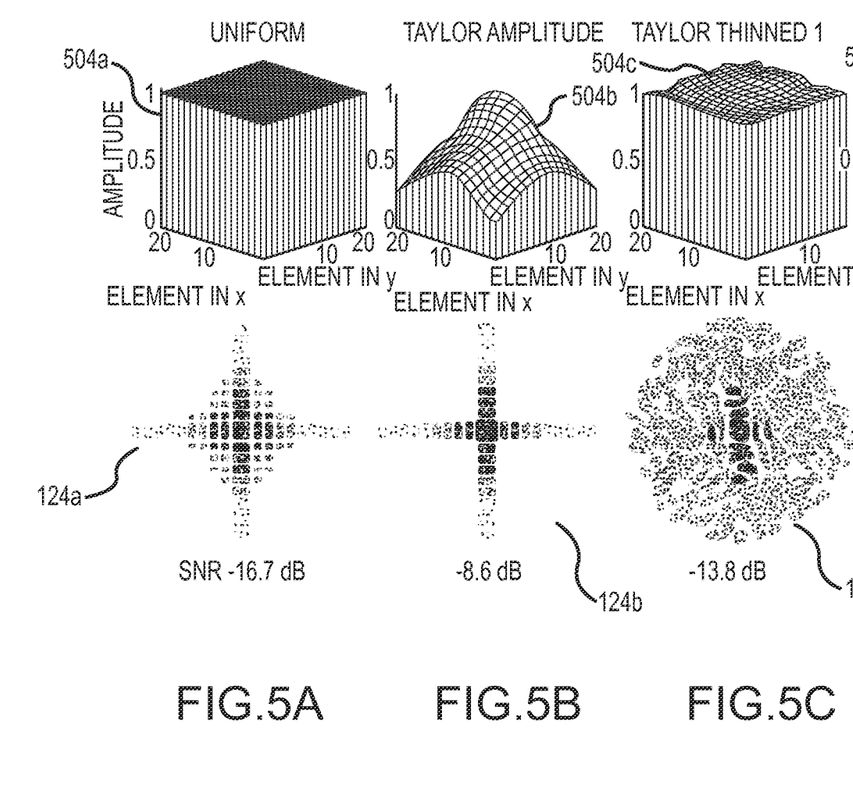
FIGS. 5A-D depict exemplary excitation patterns and associated responses of an antenna array in accordance with embodiments of the present disclosure.

FIGS. 5A-5D depict exemplary excitation patterns and associated responses of an antenna array 116 in accordance with embodiments of the present invention. In particular, FIG. 5A illustrates a beam pattern 124a obtained from applying a uniform excitation 504a to each of the elements 120 within an array 116. For the uniform excitation pattern, and with an interfering source at 7.7° to the antenna array 116, the signal to noise ratio realized with respect to a desired signal 110 is, in this example, −16.7 dB.

FIG. 5B shows the effect of applying an amplitude taper 504b, in this example a Taylor amplitude taper, across antenna elements 120 within an array 116. In particular, as shown in the associated beam pattern 124b, the effect of applying the taper is to reduce the amount of energy contained within sidelobes. In addition, the signal to noise ratio realized with respect to a desired signal 110 is improved to −8.6 dB, as compared to the untapered, uniform excitation pattern.

FIG. 5C illustrates an excitation pattern 504c after the Taylor amplitude pattern has been thinned according to embodiments of the present disclosure. In this example, for an interfering signal source 112 at an angle of 7.7° with respect to the antenna system 104, the signal to noise ratio is −13.8 dB, which represents a decrease in performance as compared to the tapered but unthinned excitation pattern illustrated in FIG. 5B. Accordingly, the beam pattern 124c produced by the first thinned excitation pattern 504c illustrated in FIG. 5C apparently has a sidelobe encompassing an interfering signal 114.

Figure 5D:
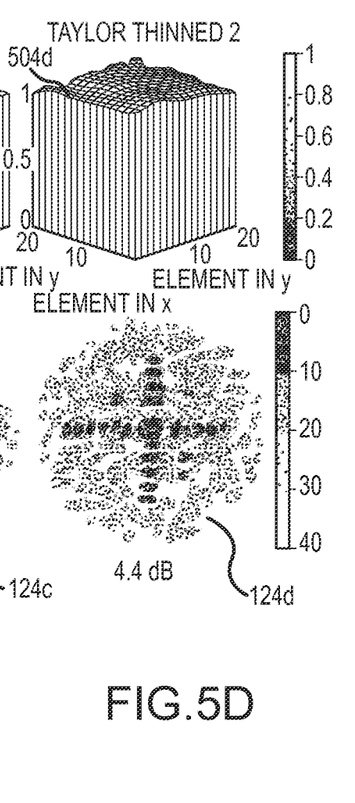

The example in FIG. 5D shows the Taylor amplitude excitation pattern, with a second thinning pattern 504d applied. The beam pattern 124d that results from the application of the second thinning pattern 504d provides, in this example with a source of interference at an angle of 7.7° to the antenna array 120, a signal to noise ratio of 4.4 dB. Accordingly, it is apparent that the interfering signal 114 from the source of interference 112 falls into a null 136 in the beam pattern 124d produced by the application of the second thinning pattern 504d.

The thinning patterns used to modify the standard Taylor taper, as illustrated in FIGS. 5C and 5D can be generated randomly or pseudo-randomly. Alternatively or in addition, the thinning patterns can be predetermined, and stored in memory 328. For example, a plurality of thinning patterns can be generated by the dynamic thinning pattern module that selectively and pseudo-randomly turn off some proportion of antenna elements 120 that would otherwise be active according to a standard taper, and these thinning patterns can be stored in memory 328 for later use. Alternatively, a plurality of thinning patterns can be pseudo-randomly generated by a separate computer system, and then stored in memory 328 for later selection and use by the dynamic thinning pattern module 324. The thinning pattern may be in the form of instructions to operate or not operate individual elements 120 of the antenna array 116.

Figure 6:
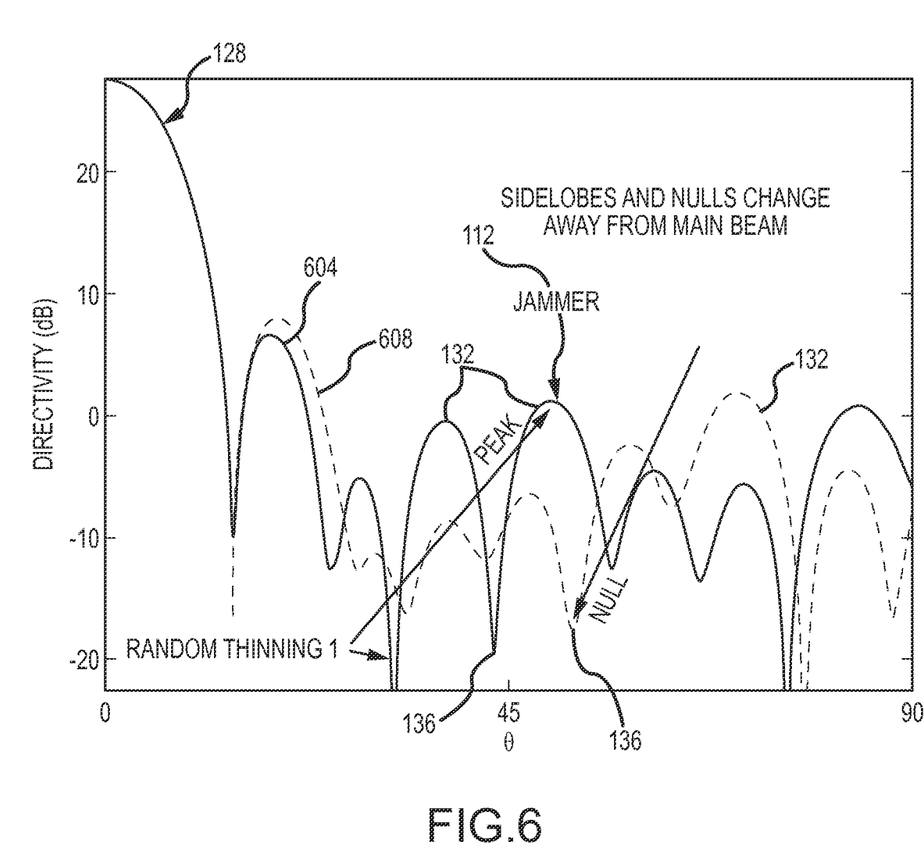
FIG. 6 depicts exemplary responses of an antenna array in accordance with embodiments of the present invention.

FIG. 6 depicts exemplary responses of an antenna array 116 in accordance with embodiments of the present invention. In particular, a first modified response curve 604, associated with a beam pattern 124, is generated by applying a first thinning pattern to a tapered output. This first modified response 604 is illustrated in one dimension (e.g., in azimuth angle) in the figure. An alternate or second modified response curve 608, generated by applying a second thinning pattern to the tapered amplitude, is also shown. From the figure, it can be seen that the main beam 128 is substantially unchanged as between the two different thinning patterns. However, the location of sidelobes 132 and nulls 136 change as between the signal 504 generated by applying the first thinning pattern, and the signal 508 generated from applying the second thinning pattern. If a location of an interfering signal 112 falls on a sidelobe 132, the signal to noise ratio realized by the antenna system 104 will be less favorable than if the relative location of the interfering signal source 112 corresponds to a null 136. Thus, in the example shown in FIG. 6, by switching from the first thinning pattern to the second thinning pattern, the signal to noise ratio of the antenna system 104 can be improved, since switching to the second thinning pattern places the interfering signal 114 into a null 136.

Figure 7:
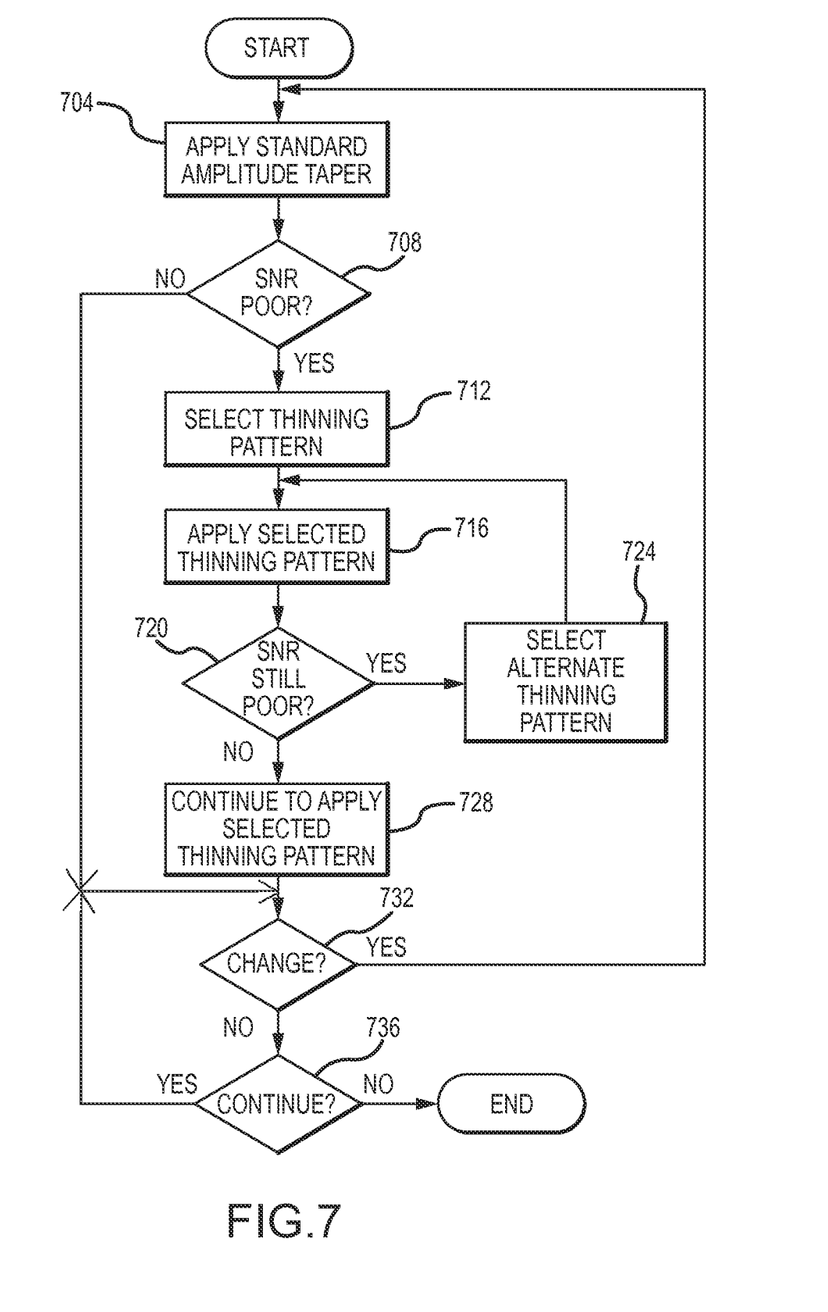
FIG. 7 is a flowchart depicting aspects of the operation of an antenna system in accordance with embodiments of the present disclosure.

FIG. 7 is a flowchart depicting aspects of the operation of an antenna system 104 in accordance with embodiments of the present disclosure. Initially, at step 704, an antenna system 104 is operated by applying a standard amplitude taper. For example, a Taylor amplitude taper can be applied, to produce a main beam 128 with a relatively high level of gain, and sidelobes 132 with a relatively low amount of total energy. As can be appreciated by one of skill in the art, the application of an amplitude taper can include electronically steering the main beam 128 of the beam pattern 124 to point the main beam 128 towards the source 108 of a signal of interest 110. Alternatively or in addition, the main beam 128 can be steered by mechanically steering the antenna array 116 and/or the platform 124 to which the antenna array 116 is mounted.

At step 708, a determination can be made as to whether the signal to noise ratio achieved with respect to the desired signal 110 is above a minimum threshold level. This minimum threshold level can be a predetermined level, a selected level, or a variable level. If the realized signal to noise ratio is poor (i.e., it is less than the minimum threshold), a thinning pattern can be selected (step 712). Selecting a thinning pattern can include retrieving a predetermined thinning pattern from memory. Selecting a thinning pattern can also include generating a thinning pattern on demand. Whether the thinning pattern is predetermined or generated just prior to the time of application, that pattern can be generated randomly or pseudo-randomly. For example, for each element 120 within an array 116, a value within a specified range (e.g., 0 to 1) can be generated randomly or pseudo-randomly.

At step 716, the selected thinning pattern is applied to modify the standard amplitude taper. In particular, the thinning pattern can be applied to control whether an element 120 of the array 116 that is otherwise active when the standard taper is applied after the application of the thinning pattern. Accordingly, the thinning pattern can be applied as an overlay or filter to the standard taper. In accordance with still other embodiments of the present disclosure, the determination as to whether a particular element 120 is turned off by the thinning pattern is made by comparing a numeric value assigned to that element 120 by the thinning pattern to a numeric value representing an amplification level or weighting applied with respect to that antenna element 120 according to the standard taper. The range of values associated with an antenna element 120 by the thinning pattern and the amplitude level or weighting associated with the antenna element 120 by the standard taper can be normalized so that they fall within the same range (e.g., 0 to 1). Application of the thinning pattern can then include comparing the normalized value assigned to the element 120 by the thinning pattern to the normalized value assigned to the element 120 by the standard taper. If the value assigned by the thinning pattern is equal to or greater than the value assigned by the standard taper, the element 120 is driven at the amplitude specified by the standard taper. Otherwise, the element is turned off. As can be appreciated by one of skill in the art after consideration of the present disclosure, the application of the thinning pattern has the effect of reducing the number of antenna elements 120 that are driven according to the standard taper. The overall effect is to continue to approximate the main beam 128 produced by the standard taper, while changing the locations of sidelobes 132 and nulls 136.

At step 720, a determination is made as to whether the signal to noise ratio remains unacceptable. For example, the determination that the signal to noise ratio remains unacceptable can be made by determining that the signal to noise ratio remains below the first threshold. If the signal to noise ratio remains poor, an alternate thinning pattern can be selected (step 724) and applied. Selecting an alternate thinning pattern can include selecting a different thinning pattern from a set of predetermined thinning patterns stored in memory. The selection of an alternate thinning pattern can be made from a set of predetermined thinning patterns randomly, pseudo-randomly, or in a predetermined sequence. In accordance with still other embodiments, an alternate thinning pattern can be generated in response to the determination that the previous thinning pattern has not improved the signal to noise ratio sufficiently. In accordance with still other embodiments, the signal to noise ratio achieved by the application of different thinning patterns can be recorded, such that a "best" thinning pattern can be used as a basis for the creation of an alternate thinning pattern, or so that the best thinning pattern found thus far can be applied where alternate thinning patterns applied subsequently do not improve the signal to noise ratio of the antenna system 104. In accordance with still other embodiments, a genetic algorithm can be applied to identify a best thinning pattern for application in connection with a particular set of conditions. After an alternate thinning pattern has been selected, the process can return to step 720, where a further determination as to whether the signal to noise ratio of the antenna system 104 remains poor can be made.

If at step 720 the signal to noise ratio is found to have improved enough that the first or a minimum threshold is exceeded, then operation of the antenna system 104 is continued using the selected thinning pattern (step 728). After operating the antenna system using the selected thinning pattern at step 728, or after determining that the signal to noise ratio is acceptable at step 708, a determination can be made as to whether the applied taper should be modified or modified according to a different thinning pattern (step 732). This determination can be made in various ways. For example, an applied thinning pattern can be removed from time to time (e.g., periodically), to determine whether the signal to noise ratio achieved by the antenna system 104 is better with or without the thinning pattern in place. If it is determined that the interfering signal 114 is no longer present, the process can return to step 704, and the antenna array 116 can be operated using the standard taper, without the application of a thinning pattern. As a further example, a determination can be made as to whether the signal to noise ratio has decreased. If the signal to noise ratio has decreased, the process can return to step 704, and the standard taper can be applied. If the signal to noise ratio continues to be below the threshold, the process can continue through the steps of selecting and applying thinning patterns.

At step 736, a determination can be made as to whether operation of the process for selecting and applying thinning patterns to improve the signal to noise ratio realized by an array antenna 116 should continue. Although shown in the figure as being entered after determining that a change in a thinning pattern is not required, it should be appreciated that the process could be discontinued at any time. If operation should continue, the process can return to step 732. Accordingly, the selection and application of thinning patterns is a dynamic process that can be performed continuously. Alternatively, the process can end.

In accordance with embodiments of the present disclosure, a full wave electromagnetic model can be developed for an antenna system 104. This can be done using commercial software. The model is coupled with an adaptive genetic algorithm, which can, for example, be implemented in MATLAB. The adaptive genetic algorithm can be executed by the controller 316, to dynamically change the array thinning. For different thinning configurations, the signal to noise ratio is calculated to determine the effectiveness of the adaptive process.

More particularly, a phased array antenna can be operated using a standard amplitude taper. In response to determining that the observed signal to noise ratio of a desired signal is below a predetermined level, a thinning pattern can be applied. Moreover, different thinning patterns may be applied until the observed signal to noise ratio reaches an acceptably high level.

The different thinning patterns may be predetermined and applied in sequence or randomly. Alternatively, the different thinning patterns may be generated at or immediately before the time at which they are applied to the standard pattern. In an exemplary embodiment, the thinning pattern may be implemented in connection with a pseudo-random number generator. The pseudo-random number generator is operated to generate a number for each element of the array. The number may be a value that is within a range of from 0 to 1. The number generated for a particular element is compared to the taper of the standard pattern, where the weighted amplitude level or output of each element of the array for the standard pattern is normalized to fall within a range of from 0 to 1. If the number that was obtained from the pseudo-random number generator for a particular element is equal to or greater than the number for that element according to the standard pattern, the element remains on. Conversely, if the number obtained from the pseudo-random number generator for the element is less than the number according to the standard pattern, the element is turned off. In this way, the thinning that is implemented with respect to the standard pattern can approximate a Gaussian function.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method of dynamically thinning the aperture of a phased array antenna, comprising:
   applying a first taper to antenna elements included in the phased array antenna;
   while the first taper is applied, determining whether a signal strength of a first received signal is acceptable;
   in response to determining that the strength of the first received signal is not acceptable, selecting a first thinning pattern;
   modifying the first taper by applying the first thinning pattern, wherein a first set of the antenna elements included in the phased array antenna is active while the first taper is applied before the first taper is modified by applying the first thinning pattern, and wherein a second set of the antenna elements included in the phased array antenna is active while the first taper is applied after the first taper is modified by applying the first thinning pattern.

2. The method of claim 1, wherein determining whether a signal strength of a first received signal is acceptable includes determining whether an observed signal to noise ratio is less than a desired amount, wherein the first taper is modified by applying the first thinning pattern in response to the determination that the observed signal to noise ratio is less than the desired amount.

3. The method of claim 1, further comprising:
   while the first thinning pattern is applied, determining whether a signal strength of at least one of the first received signal and a second received signal is acceptable;
   in response to determining that the strength of the at least one of the first received signal and a second received signal is not acceptable, selecting a second thinning pattern;
   modifying the first taper by applying the second thinning pattern, wherein a third set of the antenna elements included in the phased array antenna is active while the first taper is applied after the first taper is modified by applying the second thinning pattern.

4. The method of claim 1, further comprising:
   determining a signal strength of at least one of the first received signal and second received signal while the first thinning pattern is applied;
   modifying the first taper by applying a second thinning pattern;
   determining a signal strength of the at least one of the first received signal and the second received signal while the second thinning pattern is applied, wherein the thinning pattern that results in a highest signal strength of the at least one of the first received signal and the second received signal is identified.

5. The method of claim 4, further comprising:
   applying the thinning pattern identified as resulting in the highest signal strength of the at least one of the first received signal and the second received signal.

6. The method of claim 5, further comprising:
   determining that the signal strength of the at least one of the first received signal and the second received signal has dropped below a threshold level;
   in response to determining that the signal strength of the at least one of the first received signal and the second received signal has dropped below the threshold level, selecting and applying another thinning pattern;
   in response to determining that a signal strength for the applied thinning pattern is acceptable, continuing the application of the thinning pattern identified as resulting in the highest signal strength.

7. The method of claim 6, wherein the first and second thinning patterns are selected from a set of predetermined thinning patterns.

8. The method of claim 7, wherein the first and second thinning patterns are selected from the set of predetermined thinning patterns pseudo-randomly.

9. The method of claim 6, wherein the first and second thinning patterns each result in different sidelobe and null patterns.

10. The method of claim 9, wherein the first and second thinning patterns leave a main beam substantially unaltered.

11. An antenna system, comprising:
    a plurality of antenna elements;
    a controller operable to execute application programming, wherein the application programming includes:
       instructions to apply a first taper pattern to a signal received by the plurality of elements;
       instructions to determine a signal to noise ratio of the signal received by the plurality of elements;
       instructions to apply a first thinning pattern to the first taper pattern in response to the determined signal to noise ratio being less than a first threshold amount, wherein the first thinning pattern alters a set of operating antenna elements, wherein a first set of the antenna elements is active before the first thinning pattern is applied to the first taper pattern, and wherein a second set of the antenna elements is active after the first thinning pattern is applied to the first taper pattern.

12. The system of claim 11, further comprising:
    memory, wherein a plurality of thinning patterns are stored in the memory, and wherein the plurality of thinning patterns includes the first thinning pattern.

13. The system of claim 12, wherein the application programming includes instructions to pseudo-randomly select a thinning pattern from the plurality of thinning patterns.

14. The system of claim 11, wherein the antenna elements are included within a phased array of antenna elements.

15. The system of claim 11, wherein the application programming further includes:
    instructions to discontinue the application of the first thinning pattern in response to determining that the determined signal to noise ratio is above at least one of the first threshold amount and a second threshold amount.

16. The system of claim 11, further comprising:
a plurality of amplifiers, wherein the application of a first thinning pattern includes operating at least some of the plurality of amplifiers to provide a revised amplification amount.

17. The system of claim 11, further comprising:
a plurality of switches, wherein the first thinning pattern is operable to control the switches such that at least some of the antenna elements are turned off.

18. A method for improving the signal to noise ratio of an array antenna, comprising:
determining a taper pattern to produce a beam pattern using a plurality of antenna elements included in an antenna array directed in a desired direction, wherein the taper pattern is applied to a plurality of the antenna elements;
applying the determined taper pattern to produce the beam pattern;
detecting a first signal to noise ratio with respect to a desired signal;
determining whether the detected first signal to noise ratio is below a first threshold level;
in response to determining that the first signal to noise ratio is less than the first threshold level, applying a first thinning pattern to the taper pattern, wherein the first thinning pattern deactivates a first subset of the antenna elements, and wherein the application of the first thinning pattern results in a first sidelobe pattern;
while applying the first thinning pattern to the taper pattern, detecting a second signal to noise ratio with respect to the desired signal;
determining whether the detected second signal to noise ratio is at least one of below the first threshold level or below a second threshold level;
in response to determining that the second detected signal to noise ratio is less than at least one of the first threshold level or the second threshold level, applying a second thinning pattern to the taper pattern, wherein the second thinning pattern deactivates a second subset of the antenna elements, and wherein the application of the second thinning pattern results in a second sidelobe pattern.

19. The method of claim 18, wherein the first thinning pattern pseudo-randomly deactivates the first subset of the antenna elements.

20. The method of claim 19, further comprising:
generating the first thinning pattern, wherein generating the first thinning pattern includes, for each antenna element:
generating a normalized pseudo random value for at least most of the antenna elements of the array antenna;
comparing the normalized pseudo random value to a normalized amplification value; and
deactivating the antenna element if the normalized amplification value is less than the normalized pseudo-random value.

* * * * *

UNITED STATES PATENT AND TRADEMARK OFFICE
CERTIFICATE OF CORRECTION

PATENT NO. : 9,568,590 B1  
APPLICATION NO. : 14/161481  
DATED : February 14, 2017  
INVENTOR(S) : Randy L. Haupt, Luke J. Albers and Manoja D. Weiss Page 1 of 1

It is certified that error appears in the above-identified patent and that said Letters Patent is hereby corrected as shown below:

In the Claims

In Claim 4, Column 9, Line 66, following "and" and before "second received signal" insert --a--.

Signed and Sealed this
Sixteenth Day of May, 2017

Michelle K. Lee
*Director of the United States Patent and Trademark Office*